US008576896B2

(12) United States Patent
Bar-Ness et al.

(10) Patent No.: US 8,576,896 B2
(45) Date of Patent: Nov. 5, 2013

(54) DECODING OF ORTHOGONAL SPACE TIME CODES

(75) Inventors: Yeheskel Bar-Ness, Marlboro, NJ (US); Amir Laufer, Highland Park, NJ (US)

(73) Assignee: New Jersey Institute Of Technology, Newark, NJ (US)

( * ) Notice: Subject to any disclaimer, the term of this patent is extended or adjusted under 35 U.S.C. 154(b) by 1188 days.

(21) Appl. No.: 12/365,812

(22) Filed: Feb. 4, 2009

(65) Prior Publication Data

US 2010/0195703 A1 Aug. 5, 2010

(51) Int. Cl.
*H04B 1/38* (2006.01)

(52) U.S. Cl.
USPC ........... 375/219; 375/267; 375/347; 375/349; 375/340; 455/132; 455/134; 455/135; 455/101; 455/226.1; 455/226.3

(58) Field of Classification Search
USPC .......... 375/267, 219, 347, 349, 340; 455/132, 455/134, 135, 101, 226.1, 226.3
See application file for complete search history.

(56) References Cited

U.S. PATENT DOCUMENTS

| | | | |
|---|---|---|---|
| 7,684,378 B2 | 3/2010 | Kwak et al. | |
| 7,725,091 B2 | 5/2010 | Legouable et al. | |
| 7,903,753 B2 * | 3/2011 | Lee et al. | 375/267 |
| 7,949,060 B2 * | 5/2011 | Ling et al. | 375/260 |
| 2005/0068909 A1 | 3/2005 | Chae et al. | 370/278 |
| 2008/0032625 A1 * | 2/2008 | Cheung et al. | 455/39 |
| 2008/0253478 A1 * | 10/2008 | Kim et al. | 375/299 |
| 2009/0202015 A1 * | 8/2009 | Kwon et al. | 375/267 |

FOREIGN PATENT DOCUMENTS

| | | |
|---|---|---|
| JP | 2007534250 A | 11/2007 |
| JP | 2008519561 A | 6/2008 |

OTHER PUBLICATIONS

Jain et al. "on converting OSTC scheme from non-full rate to full-rate with better error performance"; IEEE, Dec. 2008; pp. 230-235.*
Jain et al. "On converting OSTC scheme from non-full rate to full-rate with better error performance" IEEE, december 2008, pp. 230-235.*
Laufer et al., "Full Rate Space Time Codes With Large Number of Transmitting Antennas, Linear Complexity Decoder and High Performance," Oct. 2009, The Center of Wireless Communications and Signal Processing Research, NJ, USA.
Ma, W-K., et al., "Blind maximum-likelihood decoding for orthogonal space-time block codes: a semidefinite relaxation approach," Global Telecommunications Conference, IEEE, vol. 4, pp. 2094-2098, Dec. 2003.
Stoica, P., and Ganesan, G., "Space-Time Block Codes: Trained, Blind and Semi-Blind Detection," IEEE International Conference on Acoustics, Speech, and Signal Processing (ICASSP), vol. 2, pp. 1609-1612, May 2002.
Xu, H., et al., "Blind detection based space-time block coding with antenna subset selection Signal Processing," 7th International Conference on Signal Processing, vol. 2, pp. 1731-1734, Aug. 2004.

* cited by examiner

*Primary Examiner* — Daniel Washburn
*Assistant Examiner* — Rahel Guarino
(74) *Attorney, Agent, or Firm* — Turk IP Law, LLC

(57) ABSTRACT

Implementations of improved OSTC decoding are disclosed where received channel output corresponding to a partial OSTC codeword may be used to generate estimated channel output, and where the received channel output and the estimated channel output may be used to reconstruct the OSTC codeword.

26 Claims, 6 Drawing Sheets

500 A computer program product.

502 A signal bearing medium.

504 at least one of
one or more instructions for receiving channel output at a wireless device, the received channel output corresponding to a transmitted portion of an OSTC codeword;

one or more instructions for determining estimated channel output corresponding to a non-transmitted portion of an OSTC codeword;

one or more instructions for reconstructing an OSTC codeword using both received channel output and estimated channel output;

one or more instructions for decoding symbols using a reconstructed OSTC codeword;

one or more instructions for implementing a decoder;

one or more instructions for determining an equivalent channel matrix;

one or more instructions for iteratively determining estimated channel output corresponding to a non-transmitted portion of an OSTC codeword, and reconstructing the OSTC codeword using both received channel output and estimated channel output until an error value associated with estimated channel output falls below a threshold value; or one or more instructions for providing an indication of a selected communications channel.

| 506 a computer-readable medium. | 508 a recordable medium. | 510 a communications medium. |

FIG. 5

DECODING OF ORTHOGONAL SPACE TIME CODES

BACKGROUND

Orthogonal Space Time Codes (OSTC) are commonly used in Multiple Input Multiple Output (MIMO) communication schemes. In MIMO systems the orthogonality of OSTC codes permits full diversity along with relatively simple decoding at the receiver. While OSTC codes exhibit orthogonality for any number of transmitting antennas, the code rate, that is, the ratio between the number of symbols transmitted in each codeword and the number of time slots needed to complete the codeword transmission, decreases as a function of increasing numbers of transmit antennas.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 5 illustrates an example computer program product; and

DETAILED DESCRIPTION

Figure 1:
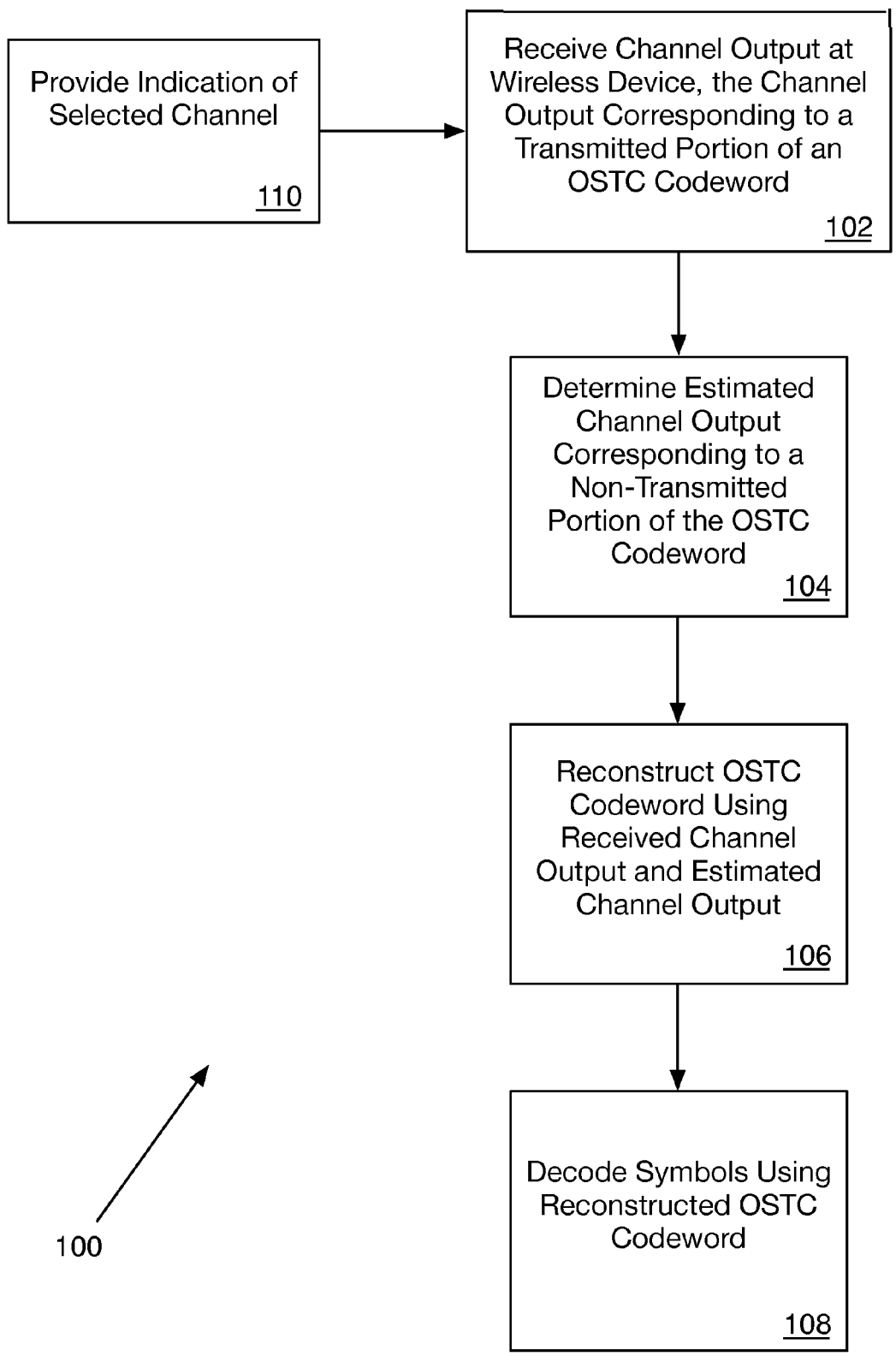
FIG. 1 is a flow chart illustrating an example process for improved OSTC decoding.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

In the following description, algorithms and/or symbolic representations of operations on data bits and/or binary digital signals stored within a computing system, such as within a computer and/or computing system memory may be presented. An algorithm is generally considered to be a self-consistent sequence of operations and/or similar processing leading to a desired result where the operations may involve physical manipulations of physical quantities that may take the form of electrical, magnetic and/or electromagnetic signals capable of being stored, transferred, combined, compared and/or otherwise manipulated. In various contexts such signals may be referred to as bits, data, values, elements, symbols, characters, terms, numbers, numerals, etc. Those skilled in the art will recognize, however, that such terms may be used to connote physical quantities. Hence, when terms such as "storing", "processing", "retrieving", "calculating", "determining" etc. are used in this description they may refer to the actions of a computing platform, such as a computer or a similar electronic computing device such as a cellular telephone, that manipulates and/or transforms data represented as physical quantities including electronic and/or magnetic quantities within the computing platform's processors, memories, registers, etc.

This disclosure is drawn, inter alia, to methods, apparatus, and systems related to the decoding of partial OSTC codewords.

Briefly stated, the present disclosure is generally related to the decoding of partial OSTC codewords. For example, as will be described, a wireless device may receive a partial OSTC codeword having some but not all rows of the codeword, and may reconstruct the codeword by estimating the missing row(s) of the OSTC codeword using the received rows. The receiving device may use the reconstructed OSTC codeword to decode the data symbols conveyed in the codeword. In some implementations, the receiving device may provide the wireless device transmitting the partial OSTC codeword with information indicating one or more selected transmission channels. The transmitting device may then use the indication of a selected transmission channel to determine which row(s) to exclude to form the partial OSTC codeword.

As used herein the term Orthogonal Space Time Codes (OSTC) coding refers to any wireless coding scheme in which spatial coding is achieved by the use of multiple transmitting units, such as antennas, corresponding to different transmission channels or frequencies, and temporal coding is achieved by using multiple time intervals or time slots to transmit data symbols. In addition, as used herein the term Multiple Input Multiple Output (MIMO) refers to any type of wireless communications system that employs multiple transmitting antennas and multiple receiving antennas, while the term Multiple Input Single Output (MISO) refers to any communications system that employs multiple transmitting antennas in combination with a single receiving antenna. For example, although claimed subject matter is not limited in this regard, a MIMO system may include a wireless device or system employing multiple receiving antennas in communication with other wireless devices such as base stations, cell phones, lap top computers, etc., that employ multiple transmitting antennas. Also, while claimed subject matter is not limited in this regard, a MISO system may include a wireless device or system employing a single receiving antenna in communication with other wireless devices such as base stations, cell phones, lap top computers, etc., that employ multiple transmitting antennas.

Further, as used herein, a collection of OSTCs may be represented by a codeword that specifies which portions of coded data are to be transmitted by which antenna during which time slot. Moreover, as used herein, the term "OSTC codeword" refers to any collection of data used to represent the temporal and spatial characteristics of data symbols that are to be transmitted by multiple antennas over multiple time slots where each antenna, at each time slot, transmits a linear combination of data symbols and/or conjugates of data symbols. Thus, for example, although claimed subject matter is not limited to particular codeword representations, an OSTC codeword may be represented as a matrix where each row of the matrix corresponds to a different time slot, each column of the matrix corresponds to a different transmitting antenna, and each entry of the matrix corresponds to a linear combination of a data symbol and/or a conjugate of the data symbol. Further, one or more transmit antennas may be inactive during some time slots. Thus, during a given time slot an OSTC codeword may include a corresponding zero or null entry in the codeword to specify that a particular antenna is to not transmit a data symbol during that time slot.

An OSTC codeword may be represented in matrix form as follows:

$$X = \begin{pmatrix} \chi_{11} & \cdots & \chi_{1N} \\ \vdots & \ddots & \vdots \\ \chi_{T1} & \cdots & \chi_{TN} \end{pmatrix} \quad \text{(eq. 1)}$$

where the $\chi_{TN}$ entries correspond to the data symbols transmitted by the $N^{th}$ antenna during the $T^{th}$ time slot. The channel output in such a system may be given by:

$$y = Xh + n \quad \text{(eq. 2)}$$

where y and n correspond to vectors of length T and represent the channel outputs and the system noise, respectively, and h corresponds to a vector of length N and represents the channel coefficients.

In some implementations, a partial OSTC codeword may be received at a wireless device, a missing portion of the OSTC codeword may be estimated, the received and missing portions may be combined to generate a reconstructed OSTC codeword, and the reconstructed OSTC codeword may be used to decode symbols of the OSTC codeword. In other words, in some implementations, partial OSTC codewords may be received in which one or more time slots and associated data symbols for those rows of the codeword are missing from the received channel output. The channel output corresponding to the missing row(s) of the OSTC codeword may then be estimated using the received channel output and a reconstructed OSTC codeword formed from the combination of the received channel output and the estimated channel output. The reconstructed OSTC codeword may then be used to decode the symbols. Further, in some implementations, information regarding the quality of one or more transmit channels may be provided by a wireless device that is to receive the partial OSTC codewords. A transmitting wireless device may then form the partial OSTC codeword by using that information to determine which row or rows of the OSTC codewords to withhold from transmission.

For example, in a system having four radio frequency (RF) transmitters with four corresponding antennas transmitting three symbols, an OSTC codeword may be represented by the following example matrix:

$$\begin{pmatrix} s_1 & s_2 & s_3 & 0 \\ -s_2^* & s_1^* & 0 & s_3 \\ -s_3^* & 0 & s_1^* & -s_2 \\ 0 & -s_3^* & s_2^* & s_1 \end{pmatrix} \quad \text{(eq. 3)}$$

where it may be seen that, in addition to k=3 symbols $S_k$, or conjugates of such symbols $S_k^*$, each row or time slot includes a zero or null value. Thus, for any given antenna (or column), there is one row (or time slot), where that antenna does not transmit a symbol. In some implementations, as noted above, an indication may be provided to a transmitting system or device that one or more channels has been selected. For example, a wireless device that is to receive OSTC codewords may provide an indication to a transmitting system or device that one or more channels have preference over other channels based on channel state information available at the receiving device such as received signal strength of a channel, signal to noise ratio, etc.

Thus, for example, a wireless device that is to receive an OSTC codeword corresponding to (eq. 3) may indicate that the first channel, corresponding to the first column of (eq. 3), is a preferred channel. In the example of (eq. 3), where there are four transmitting antennas, each associated with a separate one of four channels, a receiving device may provide a two bit signal specifying that one of the four transmit antennas is associated with a selected or preferred channel. Hence, if the wireless device that is going to receive the OSTC codeword corresponding to (eq. 3) has indicated that the first channel is preferred, then the transmitting wireless device may select to withhold from transmission the time slot corresponding to row four of (eq. 3) because the codeword indicates a null value for the selected channel during that time slot.

FIG. 1 is a flow chart illustrating an example process 100 for improved orthogonal space time code decoding, arranged in accordance with the present disclosure. Process 100, and other processes described herein, set forth various functional blocks that may be described as processing steps, functional operations, events and/or acts, etc., and that may be performed by hardware, software or any combination thereof. Those skilled in the art in light of the present disclosure will recognize that numerous alternatives to the functional blocks shown in FIG. 1 may be practiced in accordance with claimed subject matter.

Process 100 may include receiving channel output at a wireless device (block 102) where the received channel output corresponds to a transmitted portion of an OSTC codeword. For example, a wireless device or system may receive a partial OSTC codeword in block 102 where the partial OSTC codeword may be missing one or more rows or time slots corresponding to a non-transmitted portion of the codeword. Claimed subject matter is not limited to specific types of OSTCs, or to specific sizes of OSTC codewords. Thus, block 102 may comprise receiving channel output corresponding to any subset of rows of an OSTC codeword where that OSTC codeword may correspond to any type of OSTCs. Process 100 may include determining estimated channel output corresponding to a non-transmitted portion of the OSTC codeword (block 104) as will be described in further detail below. In some implementations, the channel output received in block 102 may correspond to linear combination of symbols associated with some, but not all, rows or time slots of an OSTC codeword while the estimated channel output determined in block 104 may correspond to linear combinations of symbols associated with the remaining, non-transmitted, rows or time slots of the OSTC codeword. Process 100 may then include reconstructing the OSTC codeword using the received channel output and the estimated channel output (block 106).

Figure 2:
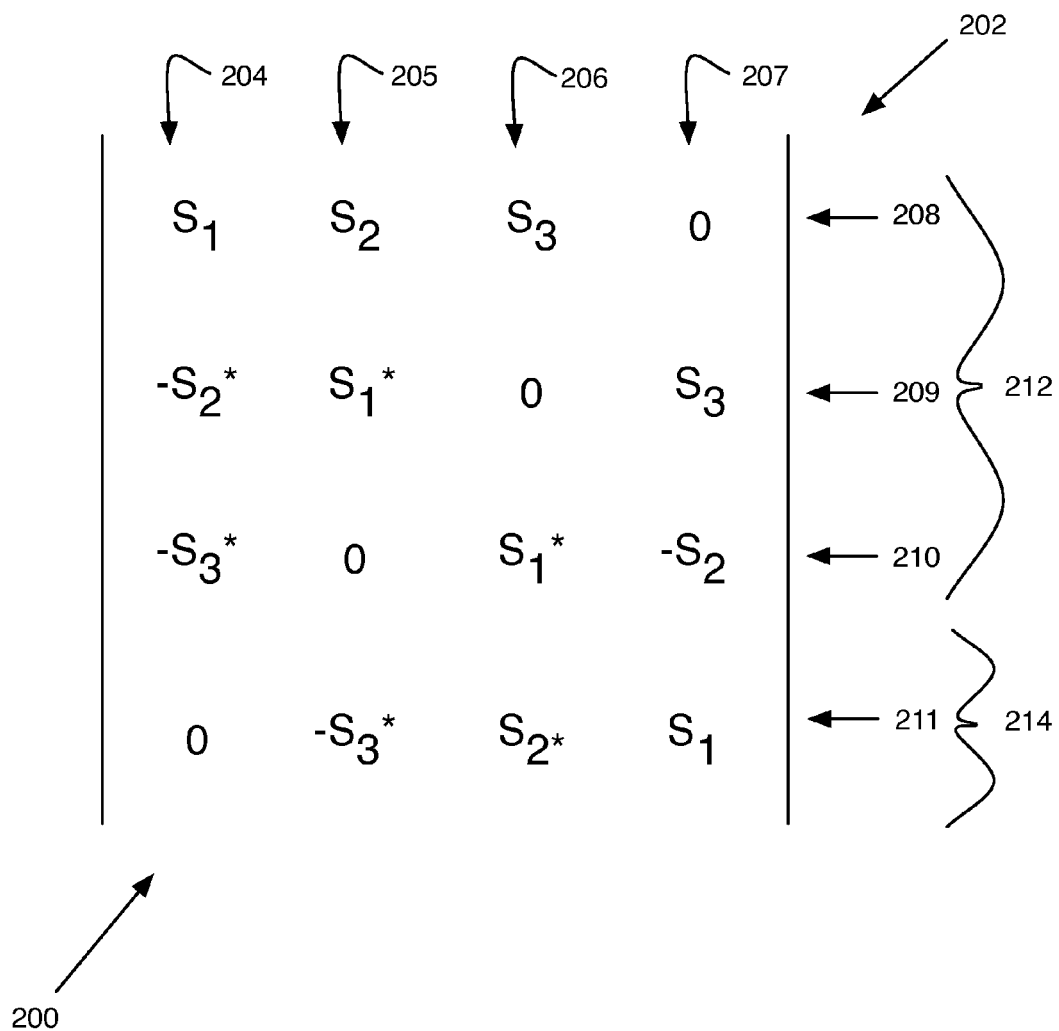
FIG. 2 illustrates an example orthogonal space time code codeword.

For instance, FIG. 2 illustrates an example OSTC codeword 200 for use in a wireless communications system having at least four transmitting units or antennas. In this example, where a matrix 202 represents codeword 200, positive or negative values of three symbols $S_1$, $S_2$ and $S_3$ (or their corresponding conjugates $S_1^*$, $S_2^*$ and $S_3^*$) are distributed throughout columns 204-207 and rows 208-211 of matrix 202, where each column represents a different transmission channel and each row represents a different time slot for transmission of the symbols. In FIG. 2, each transmission channel corresponds to symbols to be transmitted by a separate antenna of a wireless device. Thus, for example, during a time slot of OSTC codeword 200 corresponding to the first row 208 of matrix 202, an antenna corresponding to column 204 may transmit symbol $S_1$, another antenna corresponding to column 205 may transmit symbol $S_2$ and a third antenna corresponding to column 206 may transmit symbol $S_3$. Further, while the first three antennas may transmit symbols during this first time slot, a fourth antenna corresponding to column 207 may not transmit a symbol in response to the corresponding null value in row 208 of column 207.

Referring again to FIG. 1 in the context of the example of FIG. 2, block 104 may correspond to receiving, for example, channel output corresponding to rows 208-210 of a transmitted portion 212 of OSTC codeword 200. Thus, in the context of this example, block 104 may correspond to receiving channel output corresponding to portion 212 while not receiving channel output corresponding to row 211 that, in turn, represents a non-transmitted portion of codeword 200. Block 106 may then include using the symbols conveyed in the channel output received in block 104 to estimate channel output corresponding to non-transmitted portion of the OSTC codeword as will be explained in greater detail below.

Figure 3:
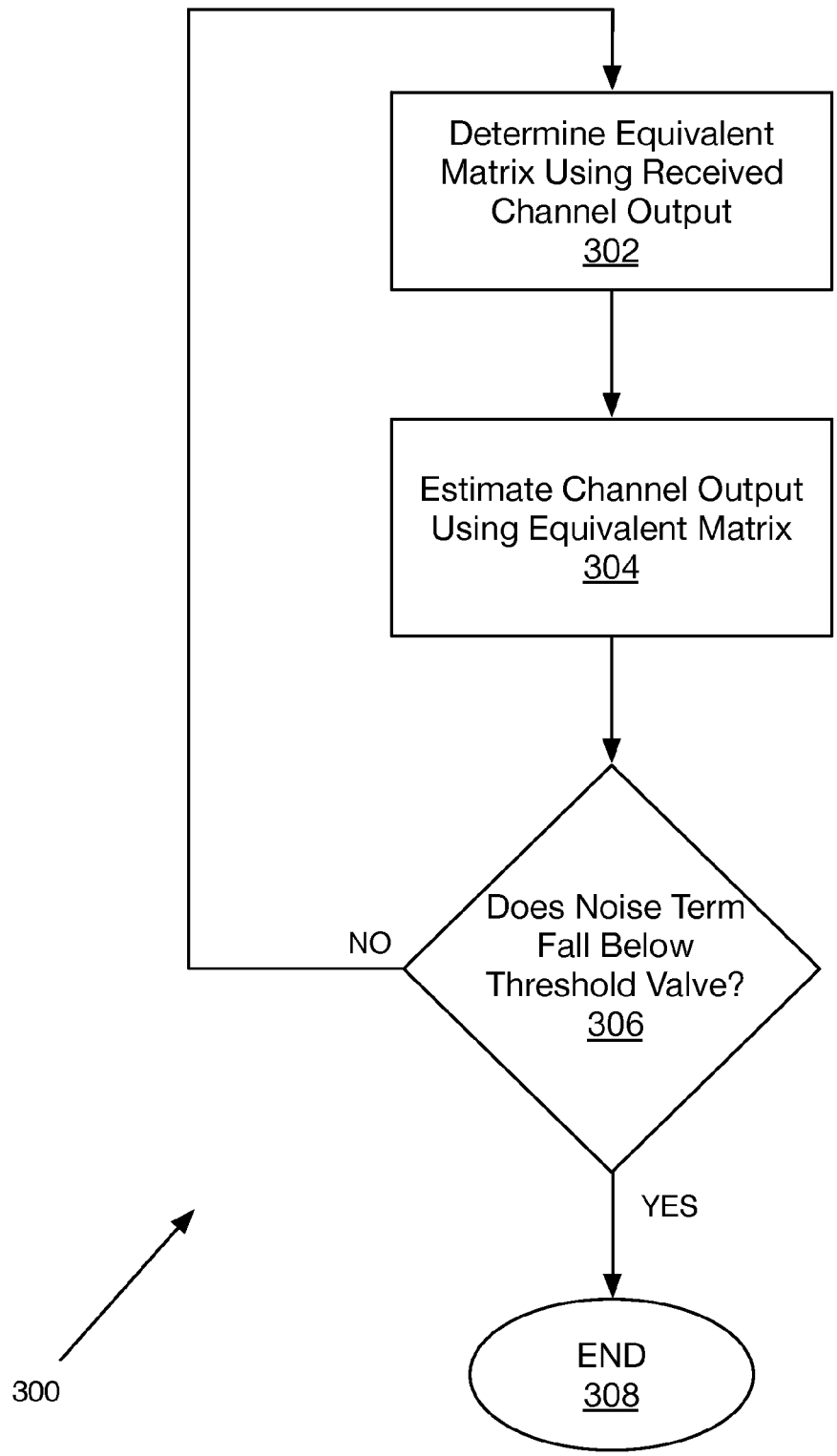
FIG. 3. is a flow chart illustrating an example process for improved OSTC decoding.

FIG. 3 is a flow chart illustrating an example process 300 for determining estimated channel output corresponding to a non-transmitted portion of an OSTC codeword, arranged in accordance with the present disclosure. For example, process 300 may be used to implement block 104 of FIG. 1. Process 300, and other processes described herein, set forth various functional blocks that may be described as processing steps, functional operations, events and/or acts, etc., and that may be performed by hardware, software or any combination thereof. Those skilled in the art in light of the present disclosure will recognize that numerous alternatives to the functional blocks shown in FIG. 3 may be practiced in accordance with claimed subject matter.

Process 300 may include determining an equivalent matrix using received channel output corresponding to a transmitted portion of an OSTC codeword (block 302). The equivalent matrix may then be used to estimate channel output corresponding to a non-transmitted portion of an OSTC codeword (block 304). In some implementations, blocks 302 and 304 may be undertaken iteratively until a value of a noise term associated with the estimated channel output falls below a threshold value (block 306). When the noise term value associated with the estimated channel output falls below a threshold value process 300 may terminate (block 308). In other implementations, blocks 302 and 304 may be undertaken in a non-iterative manner and block 308 may, consequently, not be undertaken.

In some implementations, blocks 302 and 304 may be undertaken in a non-iterative fashion where determining estimated channel output corresponding to a non-transmitted portion of an OSTC codeword in block 104 of FIG. 1 may include determining the estimated channel output using a least squares decoder although claimed subject matter is not limited in this regard and other types of decoders may be employed such as, Zero Forcing (ZF), Minimal Mean Square Error (MMSE), etc. Implementing a decoder such as a least squares decoder may include determining an equivalent channel matrix and then using the equivalent matrix to estimate channel output corresponding to a non-transmitted portion of an OSTC codeword as in block 302 of 304, respectively, of FIG. 3. To this end, an OSTC transmission may be described in equivalent channel notation where the channel output may be described by the following:

$$Y = H \cdot S + N \qquad \text{(eq. 4)}$$

where Y and S have the form $$Y = \begin{pmatrix} y_1^r \\ y_1^i \\ \vdots \\ y_N^r \\ y_N^i \end{pmatrix} \quad S = \begin{pmatrix} s_1^r \\ s_1^i \\ \vdots \\ s_k^r \\ s_k^i \end{pmatrix} \qquad \text{(eq. 5)}$$

and H is the equivalent channel matrix that may be derived from the original codeword X as will be explained below.

A space time code system may be formulated in linear space by first rewriting the output vector as $$\begin{pmatrix} y_1 \\ y_2 \\ \vdots \\ y_N \end{pmatrix} \Rightarrow \begin{pmatrix} y_1^r \\ y_1^i \\ y_2^r \\ y_2^i \\ \vdots \\ y_N^r \\ y_N^i \end{pmatrix} \qquad \text{(eq. 6)}$$

where the conversion from complex to real space may best be illustrated by the following one-dimensional example:

$$y = s \cdot h = (s^r + js^i) \cdot (h^r + jh^i) = (s^r h^r - s^i h^i) + j(s^i h^r + s^r h^i) \qquad \text{(eq. 7)}$$

which leads to the following expression:

$$\begin{pmatrix} y^r \\ y^i \end{pmatrix} = \begin{pmatrix} h^r & -h^i \\ h^i & h^r \end{pmatrix} \cdot \begin{pmatrix} s^r \\ s^i \end{pmatrix} = A \cdot \begin{pmatrix} s^r \\ s^i \end{pmatrix} \qquad \text{(eq. 8)}$$

In the case of complex symbol transmission the following expression may apply:

$$y = s^* \cdot h = (s^r - js^i) \cdot (h^r + jh^i) = (s^r h^r + s^i h^i) + j(s^r h^i - s^i h^r) \qquad \text{(eq. 9)}$$

or $$\begin{pmatrix} y^r \\ y^i \end{pmatrix} = \begin{pmatrix} h^r & h^i \\ h^i & -h^r \end{pmatrix} \cdot \begin{pmatrix} s^r \\ s^i \end{pmatrix} = B \cdot \begin{pmatrix} s^r \\ s^i \end{pmatrix} \qquad \text{(eq. 10)}$$

Because an OSTC codeword includes both data symbols and their conjugates, the equivalent matrix H may be shown to include the sub-matrices A and B of (eq. 8) and (eq. 10) respectively. The following two general sub-matrices may be defined:

$$A_k = \begin{pmatrix} h_k^r & -h_k^i \\ h_k^i & h_k^r \end{pmatrix}; B_k = \begin{pmatrix} h_k^r & h_k^i \\ h_k^i & -h_k^r \end{pmatrix}, k \in \{1, 2, \ldots, N\} \quad \text{(eq. 11)}$$

Thus, the size of H should comport with the linear system as Y=HS. Hence, if the original OSTC codeword includes T rows (corresponding to T channel uses or, equivalently, to T channel outputs), then H should include 2T rows corresponding to the 2T real outputs. Further, the number of columns of H should be 2k, where k is the number of different data symbols.

In accordance with some implementations of claimed subject matter the following algorithm may be used to determine an equivalent channel H for a given OSTC codeword X:

---
Algorithm 1 Generate H out of X
---
Let [T,N] = size (X)
for l = 1 : T do
  for m = 1 : N do
    if X(l,m) = 0 then
      ;
    else
      case X(l,m) :
        $s_n \rightarrow H_t = A_m$
        $-s_n \rightarrow H_t = -A_m$
        $s^*_n \rightarrow H_t = B_m$
        $-s^*_n \rightarrow H_t = -B_m$
    end if
    H(2l − 1 : 2l, 2n − 1 : 2n) = $H_t$
  end for
end for

---

Having determined an equivalent channel matrix as above, in undertaking, for example block 302 of process 300, the unknown portion of the channel output corresponding to an non-transmitted portion of an OSTC codeword not received in block 102 may be defined as $Y_u$ and the channel output received in block 102 may be defined as $Y_c$. Similarly, $H_u$ and $H_c$ may be defined as corresponding portions of the matrix H such that $$Y_c = H_c \cdot S \quad \text{(eq. 12)}$$

and $$Y_u = H_u \cdot S \quad \text{(eq. 13)}$$

To obtain an estimator of $Y_u$, both sides of (eq. 4) may be multipled by $$\frac{1}{\alpha} H^T$$

as follows $$\frac{1}{\alpha} H^T Y = \frac{1}{\alpha} H^T H \cdot S + \frac{1}{\alpha} H^T N = \frac{1}{\alpha} \alpha I \cdot S + \frac{1}{\alpha} H^T N = S + \frac{1}{\alpha} H^T N \quad \text{(eq. 14)}$$

which results in $$S = \frac{1}{\alpha} H^T (Y - N) \quad \text{(eq. 15)}$$

substituting (eq. 15) into (eq. 13) results in $$Y_u = H_u \cdot S = H_u \frac{1}{\alpha} H^T (Y - N) = \frac{1}{\alpha} H_u H^T Y - \frac{1}{\alpha} H_u H^T N \quad \text{(eq. 16)}$$

which may be rewritten as $$Y_u = \frac{1}{\alpha} H_u H^T Y - \frac{1}{\alpha} H_u H^T N \quad \text{(eq. 17)}$$
$$= \frac{1}{\alpha} H_u \begin{pmatrix} H_c \\ H_u \end{pmatrix}^T \begin{pmatrix} Y_c \\ Y_u \end{pmatrix} - \frac{1}{\alpha} H_u H^T N$$
$$= \frac{1}{\alpha} H_u H_c^T Y_c + \frac{1}{\alpha} H_u H_u^T Y_u - \frac{1}{\alpha} H_u H^T N$$

which, through algebraic manipulation, may be shown to reduce to $$Y_u = (\alpha I - H_u H_u^T)^{-1} H_u H_c^T Y_c - N_e \quad \text{(eq. 18)}$$

where the noise term $N_e$ is given by $$N_e = (\alpha I - H_u H_u^T)^{-1} H_u H^T N \quad \text{(eq. 19)}$$

Hence, block 304 of process 300 may be undertaken by using process logic in a wireless device to determine the equivalent channel matrix H and then to determine $Y_u$ in the manner as sort forth above. Further block 306 may include using that processing logic to iteratively undertake blocks 302 and 304 using maximum likelihood techniques until a value for the noise term $N_e$ drops below a predetermined threshold. Again, however, claimed subject matter is not limited to undertaking blocks 302 and 304 in an iterative manner.

Applying these results to the example, provided above with reference to (eq. 3), of an OSTC codeword that has been transmitted in a four antenna MISO system, the corresponding equivalent channel matrix has the form $$H = \begin{pmatrix} h_1^r & -h_1^i & h_2^r & -h_2^i & h_3^r & -h_3^i \\ h_1^i & h_1^r & h_2^i & h_2^r & h_3^i & h_3^r \\ h_2^r & h_2^i & -h_1^r & -h_1^i & h_4^r & -h_4^i \\ h_2^i & -h_2^r & -h_1^i & h_1^r & h_4^i & h_4^1 \\ h_3^r & h_3^i & -h_4^r & h_4^i & -h_1^r & -h_1^i \\ h_3^i & -h_3^r & -h_4^i & -h_4^r & -h_1^i & h_1^r \\ h_4^r & -h_4^i & h_3^r & h_3^i & -h_2^r & -h_2^i \\ h_4^i & h_4^r & h_3^i & -h_3^r & -h_3^i & h_2^i \end{pmatrix} \quad \text{(eq. 20)}$$

where, in this example, the last row of the OSTC codeword was omitted from transmission, the following expressions are obtained $$Y_c = (y_1^r y_1^i y_2^r y_2^i y_3^r y_3^i)^T, Y_u = (y_4^r y_4^i)^T \quad \text{(eq. 21)}$$

and $$H_c = \begin{pmatrix} h_1^r & -h_1^i & h_2^r & -h_2^i & h_3^r & -h_3^i \\ h_1^i & h_1^r & h_2^i & h_2^r & h_3^i & h_3^r \\ h_2^r & h_2^i & -h_1^r & -h_1^i & h_4^r & -h_4^i \\ h_2^i & -h_2^r & -h_1^i & h_1^r & h_4^i & h_4^1 \\ h_3^r & h_3^i & -h_4^r & h_4^i & -h_1^r & -h_1^i \\ h_3^i & -h_3^r & -h_4^i & -h_4^r & -h_1^i & h_1^r \end{pmatrix}, \quad \text{(eq. 22)}$$

$$H_u = \begin{pmatrix} h_4^r & -h_4^i & h_3^r & h_3^i & -h_2^r & -h_2^i \\ h_4^i & h_4^r & h_3^i & -h_3^r & -h_3^i & h_2^i \end{pmatrix}$$

To determine the result of (eq. 18) in the context of this particular example the following expression may be employed $$(\alpha I - H_u H_u^T)^{-1} = \frac{1}{|h_1|^2}\begin{pmatrix} 1 & 0 \\ 0 & 1 \end{pmatrix} = \frac{1}{|h_1|^2} I \quad \text{(eq. 23)}$$

which may be incorporated into (eq. 18) to yield $$Y_u = \frac{1}{|h_1|^2} H_u H_C^T Y_c - N_e \quad \text{(eq. 24)}$$

which may be rewritten as $$Y_u = \frac{1}{|h_1|^2}\begin{pmatrix} \text{Re}(h_4 h_1^*) & -\text{Im}(h_4 h_1^*) & -\text{Re}(h_3 h_1^*) & \text{Im}(h_3 h_1^*) & \text{Re}(h_2 h_1^*) & -\text{Im}(h_2 h_1^*) \\ \text{Im}(h_4 h_1^*) & \text{Re}(h_4 h_1^*) & -\text{Im}(h_3 h_1^*) & -\text{Re}(h_3 h_1^*) & \text{Im}(h_4 h_1^*) & \text{Re}(h_4 h_1^*) \end{pmatrix} Y_c - N_e \quad \text{(eq. 25)}$$

which, in turn, may be expressed in complex space as $$\hat{y}_4 = \frac{h4}{h1}y_1 - \frac{h3}{h1}y_2 + \frac{h2}{h1}y_3 + z \quad \text{(eq. 26)}$$

where z represents estimation error due to the additive channel noise.

Returning to the discussion of FIG. 1, once the reconstructed OSTC codeword is obtained in block 106, process 100 may continue with decoding the symbols using the reconstructed codeword (block 108). Process 100 may also include providing an indication of a selected transmission channel (block 110). For example, a wireless device, such as the device receiving the channel output in block 102, may provide an indication of a particular channel or channels. The receiving device may do so by providing a signal received by a transmitting device that will transmit the channel output received in block 102. In general such an indication may be in the form of a signal of $\log_2(N)$ bits where N is the number of transmitting channels in a MIMO or MISO system. In the example of FIG. 2 having N=4 transmitters, a device may undertake block 110 by transmitting a two-bit signal to indicate a selected channel.

Figure 4:
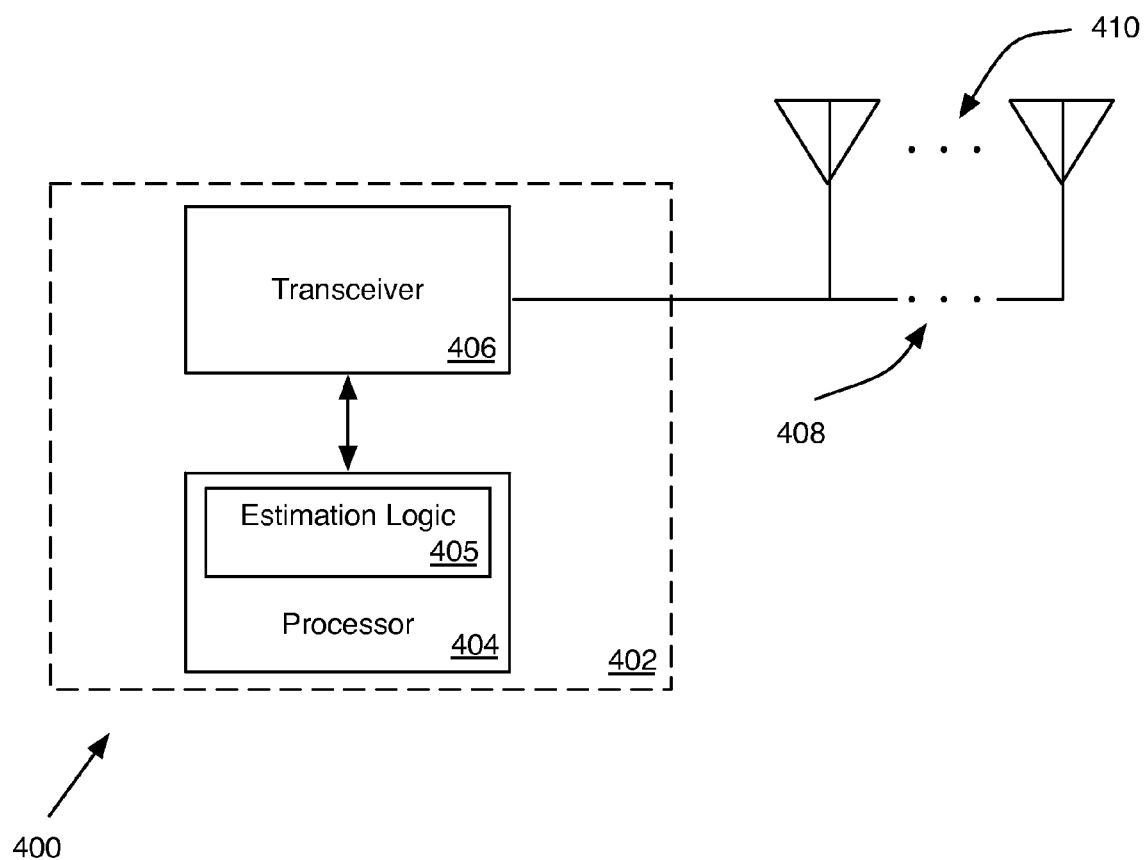
FIG. 4 illustrates an example device for wireless communication.

FIG. 4 illustrates an example device 400 for wireless communications arranged in accordance with the present disclosure. Device 400 may be used to perform some or all of the various functions discussed above in connection with FIGS. 1 and/or 3. Device 400 may include any device or collection of devices capable of undertaking MIMO or MISO wireless communications in a network. For example, device 400 may include selected components of a wireless base station, a mobile platform such as a mobile computer, a wireless node, a sensor node of a sensor network, etc., although claimed subject matter is not limited in this regard.

Device 400 may include a wireless node 402 having a processor 404, an RF transceiver 406 and one or more antennas 408. Node 402 may also include channel output estimation logic 405 that may be configured to undertake any of the blocks of FIGS. 1 and 3. Further, node 402 may also include additional items such as memory, a router, network interface logic, etc. that have not been shown in FIG. 4 for the sake of clarity. Estimation logic 405 may provide any of the functionality described herein and claimed subject matter is not limited to specific types or manifestations of processing logic. For example, processor 404 may be a microprocessor or Central Processing Unit (CPU). In other implementations, processor 404 may be an Application Specific Integrated Circuit (ASIC), a Field Programmable Gate Array (FPGA), a digital signal processor (DSP), or other integrated formats. Further, antennas 408 may be any suitable antennas including but not limited to loop, dish, parabolic, panel, sector, directional, omnidirectional, etc. Also, while an RF transceiver 406 is illustrated in FIG. 4, claimed subject matter is not limited in this regard and node 402 may, for example, employ discrete RF receiver and RF transmitter circuitry. Further, processor 404 may receive an indication of one or more selected channels in the form of a signal 410 obtained via antennas 408 and transceiver 406.

FIG. 5 illustrates an example computer program product 500 arranged in accordance with the present disclosure. Program product 500 may include a signal bearing medium 502. Signal bearing medium 502 may include one or more instructions 504 that, when executed by, for example, a processor, may provide the functionality described above with respect to FIGS. 1 and/or 3. Thus, for example, referring to the system of FIG. 4, processor 404 and/or estimation logic 405 may undertake one or more of the blocks shown in FIGS. 1 and/or 3 in response to instructions 504 conveyed by medium 502.

In some implementations, signal bearing medium 502 may encompass a computer-readable medium 506, such as, but not limited to, a hard disk drive, a Compact Disc (CD), a Digital Video Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, referring to the system of FIG. 4, program product 500 may be wirelessly conveyed to processor 404 by signal bearing medium 502, where signal bearing medium 502 is conveyed to system 400 by a wireless communications medium 510 (e.g., an wireless communications medium conforming with the 802.11 standard).

Figure 6:
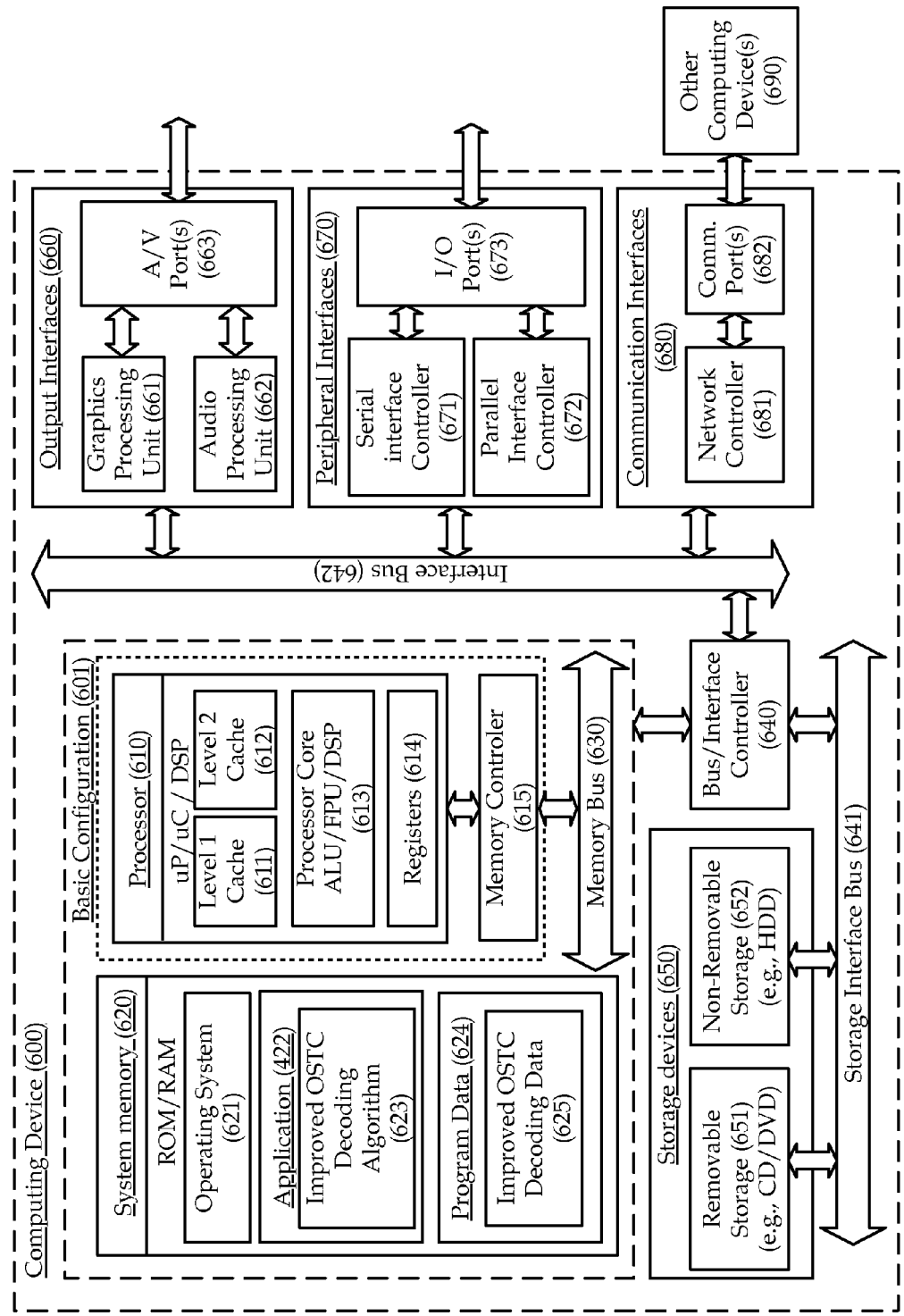
FIG. 6 is a block diagram illustrating an example computing device, all arranged in accordance with the present disclosure.

FIG. 6 is a block diagram illustrating an example computing device 600 arranged in accordance with the present disclosure. In a very basic configuration 601, computing device 600 may include one or more processors 610 and system memory 620. A memory bus 630 may be used for communicating between the processor 610 and the system memory 620.

Depending on the desired configuration, processor 610 may be of any type including but not limited to a microprocessor (μP), a microcontroller (μC), a digital signal processor (DSP), or any combination thereof. Processor 610 may include one or more levels of caching, such as a level one cache 611 and a level two cache 612, a processor core 613, and registers 614. The processor core 613 may include an arithmetic logic unit (ALU), a floating point unit (FPU), a digital signal processing core (DSP Core), or any combination thereof. A memory controller 615 may also be used with the processor 610, or in some implementations the memory controller 615 may be an internal part of the processor 610.

Depending on the desired configuration, the system memory 620 may be of any type including but not limited to volatile memory (such as RAM), non-volatile memory (such as ROM, flash memory, etc.) or any combination thereof. System memory 620 may include an operating system 621, one or more applications 622, and program data 624. Application 622 may include an improved OSTC decoding algorithm 623 that may be arranged to perform the functions as described herein including the functional blocks described with respect to process 100 of FIG. 1 and/or process 300 of FIG. 3. Program Data 624 may include data 625 for use in improved OSTC decoding algorithm 623, for example, data corresponding to coefficients of an equivalent channel matrix. In some example embodiments, application 622 may be arranged to operate with program data 624 on an operating system 621 such that implementations of improved OSTC decoding may be provided as described herein. This described basic configuration is illustrated in FIG. 6 by those components within dashed line 601.

Computing device 600 may have additional features or functionality, and additional interfaces to facilitate communications between the basic configuration 601 and any required devices and interfaces. For example, a bus/interface controller 640 may be used to facilitate communications between the basic configuration 601 and one or more data storage devices 650 via a storage interface bus 641. The data storage devices 650 may be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 620, removable storage 651 and non-removable storage 652 are all examples of computer storage media. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired Information and which can be accessed by computing device 600. Any such computer storage media may be part of device 600.

Computing device 600 may also include an interface bus 642 for facilitating communication from various interface devices (e.g., output interfaces, peripheral interfaces, and communication interfaces) to the basic configuration 601 via the bus/interface controller 640. Example output interfaces 660 include a graphics processing unit 661 and an audio processing unit 662, which may be configured to communicate to various external devices such as a display or speakers via one or more AN ports 663. Example peripheral interfaces 660 may include a serial interface controller 671 or a parallel interface controller 672, which may be configured to communicate with external devices such as input devices (e.g., keyboard, mouse, pen, voice input device, touch input device, etc.) or other peripheral devices (e.g., printer, scanner, etc.) via one or more I/O ports 673. An example communication interface 680 includes a network controller 681, which may be arranged to facilitate communications with one or more other computing devices 690 over a network communication via one or more communication ports 682. A communication connection is one example of a communication media. Communication media may typically be embodied by computer readable instructions, data structures, program modules, or other data in a modulated data signal, such as a carrier wave or other transport mechanism, and includes any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 600 can also be implemented as a personal computer including both laptop computer and non-laptop computer configurations. In addition, computing device 600 may be implemented as part of a wireless base station or other wireless system or device such as node 402 described above with respect to FIG. 4.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a storage medium or storage media. This storage media, such as CD-ROMs, computer disks, flash memory, or the like, for example, may have instructions stored thereon, that, when executed by a system, such as a computer system, computing platform, or other system, for example, may result in execution of a processor in accordance with claimed subject matter, such as one of the implementations previously described, for example. As one possibility, a computing platform may include one or more processing units or processors, one or more input/output devices, such as a display, a keyboard and/or a mouse, and one or more memories, such as static random access memory, dynamic random access memory, flash memory, and/or a hard drive.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

In the preceding description, various aspects of claimed subject matter have been described. For purposes of explanation, specific numbers, systems and/or configurations were set forth to provide a thorough understanding of claimed subject matter. However, it should be apparent to one skilled in the art and having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now, or in the future, occur to those skilled in the art. It is, therefore, to be understood that the appended claims are intended to cover all such modifications and/or changes as fall within the true spirit of claimed subject matter.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes"

should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed:

1. A method for wireless communications, comprising:
providing an indication of a preference by a wireless device of one or more transmission channels of a Multiple Input Multiple Output (MIMO) communication system, the preferred one or more transmission channels being selected by the wireless device based at least in part on a channel state information, and the indication comprising a signal comprising $\log_2(N)$ bits in which N comprises a number of transmitting channels in the MIMO communication system;
receiving channel output at the wireless device, the received channel output corresponding to a transmitted portion of an Orthogonal Space Time Code (OSTC) codeword, the OSTC codeword conveying symbols, the OSTC codeword comprising the transmitted portion and a non-transmitted portion, wherein the non-transmitted portion comprises a null value corresponding to the channel preference, the null value corresponding to the portion of received channel output having no transmission activity during a timeslot;
determining estimated channel output corresponding to the non-transmitted portion of the OSTC codeword;
reconstructing the OSTC codeword using both the received channel output and the estimated channel output; and
decoding the symbols using the reconstructed OSTC codeword.

2. The method of claim 1, wherein the wireless device includes processing logic, and wherein determining the estimated channel output comprises using the processing logic to implement a decoder.

3. The method of claim 1, wherein the wireless device includes processing logic, and wherein determining the estimated channel output comprises using the processing logic to determine an equivalent channel matrix.

4. The method of claim 1, wherein the non-transmitted portion of the OSTC codeword comprises symbols associated with one or more time slots.

5. The method of claim 1, wherein the non-transmitted portion of the OSTC codeword comprises one or more rows of the OSTC codeword.

6. The method of claim 1, wherein the wireless device includes processing logic, and wherein determining one or more estimated channel outputs comprises using the processing logic to determine:

$$Y_u = (\alpha I - H_u H_u^T)^{-1} H_u H_e^T Y_c - N_e$$

wherein $Y_u$ comprises the estimated channel output, $Y_c$ comprises the received channel output, $H_c$ comprises an equivalent channel matrix associated with $Y_c$, $H_u$ comprises an equivalent channel matrix associated with $Y_u$, and $N_e$ comprises a noise term.

7. The method of claim 1, further comprising iteratively determining estimated channel output corresponding to the non-transmitted portion of the OSTC codeword, and reconstructing the OSTC codeword using both the received channel output and the estimated channel output until an error value associated with the estimated channel output falls below a threshold value.

8. The method of claim 1, wherein:
the channel state information includes received channel signal strength and channel signal to noise ratios.

9. An article, comprising:
a computer program product comprising a non-transitory storage medium having stored therein instructions that, when executed, result in:
providing an indication of a preference by a wireless device based at least in part on channel state information, wherein the wireless device includes processing logic, and wherein determining one or more estimated channel outputs comprises using the processing logic to determine:

$$Y_u = (\alpha I - H_u H_u^T)^{-1} H_u H_e^T Y_c - N_e$$

where $Y_u$ comprises the estimated channel output, $Y_c$ comprises the received channel output, $H_c$ comprises an equivalent channel matrix associated with $Y_c$, $H_u$ comprises an equivalent channel matrix associated with $Y_u$, and $N_e$ comprises a noise term;
receiving channel output at the wireless device, the received channel output corresponding to a transmitted portion of an Orthogonal Space Time Code (OSTC) codeword, the OSTC codeword conveying symbols, the OSTC codeword comprising the transmitted portion and a non-transmitted portion, wherein the non-transmitted portion comprises a null value corresponding to the channel preference, the null value corresponding to the portion of received channel output having no transmission activity during a timeslot;

determining estimated channel output corresponding to the non-transmitted portion of the OSTC codeword;

reconstructing the OSTC codeword using both the received channel output and the estimated channel output; and decoding the symbols using the reconstructed OSTC codeword.

10. The article of claim 9, wherein the wireless device includes processing logic, and wherein determining the estimated channel output comprises using the processing logic to implement a decoder.

11. The article of claim 10, wherein the wireless device includes processing logic, and wherein determining the estimated channel output comprises using the processing logic to determine an equivalent channel matrix.

12. The article of claim 9, wherein the non-transmitted portion of the OSTC codeword comprises symbols associated with one or more time slots.

13. The article of claim 9, wherein the non-transmitted portion of the OSTC codeword comprises one or more rows of the OSTC codeword.

14. The article of claim 9, the computer program product comprising a non-transitory storage medium having stored therein further instructions that, when executed, result in:

iteratively determining estimated channel output corresponding to the non-transmitted portion of the OSTC codeword, and reconstructing the OSTC codeword using both the received channel output and the estimated channel output until an error value associated with the estimated channel output falls below a threshold value.

15. The article of claim 9, wherein: the channel state information includes received channel signal strength and channel signal to noise ratios.

16. A wireless communications apparatus, comprising: an antenna;

a wireless transceiver coupled to the antenna; and processing logic coupled to the wireless transceiver;

wherein the processing logic is configured to:

provide an indication of a preference by a wireless device of one or more transmission channels of a Multiple Input Multiple Output (MIMO) communication system, the preferred one or more transmission channels being selected by the wireless device based at least in part on channel state information, and the indication comprising a signal comprising $\log_2(N)$ bits in which N comprises a number of transmitting channels in the MIMO communication system;

receive channel output, the received channel output corresponding to a transmitted portion of an Orthogonal Space Time Code (OSTC) codeword, the OSTC codeword conveying symbols, the OSTC codeword comprising the transmitted portion and a non-transmitted portion, wherein the non-transmitted portion comprises a null value corresponding to the channel preference, the null value corresponding to the portion of received channel output having no transmission activity during a timeslot;

determine estimated channel output corresponding to the non-transmitted portion of the OSTC codeword;

reconstruct the OSTC codeword using both the received channel output and the estimated channel output; and decode the symbols using the reconstructed OSTC codeword.

17. The apparatus of claim 16, wherein the processing logic is configured to determine the estimated channel output by implementing a decoder.

18. The apparatus of claim 16, wherein the processing logic is configured to determine the estimated channel output by determining an equivalent channel matrix.

19. The apparatus of claim 18, wherein the non-transmitted portion of the OSTC codeword comprises symbols associated with one or more time slots.

20. The apparatus of claim 18, wherein the processing logic is configured to determine the estimated channel output by determining:

$$Y_u = (\alpha I - H_u H_u^T)^{-1} H_u H_c^T Y_c - N_e$$

wherein $Y_u$ comprises the estimated channel output, $Y_c$ comprises the received channel output, $H_c$, comprises an equivalent channel matrix associated with $Y_c$, $H_u$ comprises an equivalent channel matrix associated with $Y_u$, and $N_e$ comprises a noise term.

21. The apparatus of claim 18, wherein the processing logic is further configured to:

iteratively determine estimated channel output corresponding to the non-transmitted portion of the OSTC codeword, and reconstruct the OSTC codeword using both the received channel output and the estimated channel output until an error value associated with the estimated channel output falls below a threshold value.

22. A wireless communications system, comprising:

a computing device; and a wireless node coupled to the computing device, wherein the wireless node is configured to:

provide an indication of a preference by a wireless device based at least in part on channel state information;

receive channel output, the received channel output corresponding to a transmitted portion of an Orthogonal Space Time Code (OSTC) codeword, the OSTC codeword conveying symbols, the OSTC codeword comprising the transmitted portion and a non-transmitted portion, wherein the non-transmitted portion comprises a null value corresponding to the channel preference, the null value corresponding to the portion of received channel output having no transmission activity during a timeslot;

determine estimated channel output corresponding to the non-transmitted portion of the OSTC codeword by determining:

$$Y_u = (\alpha I - H_u H_u^T)^{-1} H_u H_u^T Y_c - N_e$$

wherein $Y_u$ comprises the estimated channel output, $Y_c$ comprises the received channel output, $H_c$ comprises an equivalent channel matrix associated with $Y_c$, $H_u$ comprises an equivalent channel matrix associated with $Y_u$, and $N_e$ comprises a noise term;

reconstruct the OSTC codeword using both the received channel output and the estimated channel output; and decode the symbols using the reconstructed OSTC codeword.

23. The system of claim 22, wherein the wireless node is configured to determine the estimated channel output by implementing a decoder.

24. The system of claim 22, wherein the wireless node is configured to determine the estimated channel output by determining an equivalent channel matrix.

25. The system of claim 22, wherein the non-transmitted portion of the OSTC codeword comprises symbols associated with one or more time slots.

26. The system of claim 22, wherein the wireless node is further configured to:

iteratively determine estimated channel output corresponding to the non-transmitted portion of the OSTC codeword, and reconstruct the OSTC codeword using both the received channel output and the estimated channel output until an error value associated with the estimated channel output falls below a threshold value.

* * * * *

UNITED STATES PATENT AND TRADEMARK OFFICE
CERTIFICATE OF CORRECTION

PATENT NO. : 8,576,896 B2
APPLICATION NO. : 12/365812
DATED : November 5, 2013
INVENTOR(S) : Bar-Ness et al.

Page 1 of 1

It is certified that error appears in the above-identified patent and that said Letters Patent is hereby corrected as shown below:

In the Specification

In Column 11, Line 55, delete "Information" and insert -- information --, therefor.

In Column 11, Line 66, delete "AN" and insert -- A/V --, therefor.

In the Claims

In Column 18, Line 47, in Claim 22, delete "$Y_u = (\alpha I - H_u H_u^T)^{-1} H_u H_u^T Y_c - N_e$," and insert -- $Y_u = (\alpha I - H_u H_u^T)^{-1} H_u H_c^T Y_c - N_e$ --, therefor.

Signed and Sealed this
Third Day of June, 2014

Michelle K. Lee
*Deputy Director of the United States Patent and Trademark Office*